United States Patent
Cass et al.

[15] 3,692,295
[45] Sept. 19, 1972

[54] TORSION BAR WHEEL SUSPENSION
[72] Inventors: Richard Cass, Birmingham; Edward J. Herbenar, Detroit, both of Mich.
[73] Assignee: TRW Inc., Cleveland, Ohio
[22] Filed: May 25, 1970
[21] Appl. No.: 40,318

[52] U.S. Cl. .................................267/57, 267/154
[51] Int. Cl. ........................B60g 11/18, F16f 1/14
[58] Field of Search ............267/57, 154; 280/124 B

[56] References Cited

UNITED STATES PATENTS

| | | | |
|---|---|---|---|
| 2,751,217 | 6/1956 | Thompson | 267/57 |
| 2,786,670 | 3/1957 | Hammond | 267/57 |
| 2,893,724 | 7/1959 | Kales et al. | 267/57 |
| 3,195,670 | 7/1965 | Dunn | 267/57 |
| 3,202,441 | 8/1965 | Tea | 267/57 |
| 3,263,984 | 8/1966 | Linn | 267/57 |
| 3,432,158 | 3/1969 | Goodwin | 267/57 |
| 3,490,786 | 1/1970 | Ravenel | 267/57 |

*Primary Examiner*—Drayton E. Hoffman
*Attorney*—Hill, Sherman, Meroni, Gross & Simpson

[57] ABSTRACT

A three part stabilizer bar assembly for front or rear automotive wheel suspensions having separable torsion bar and stabilizer arms accommodating replacement of any worn or broken part without discarding the other parts. The three part assembly accommodates wide variations in torsional resistance without affecting load carrying requirements.

7 Claims, 12 Drawing Figures

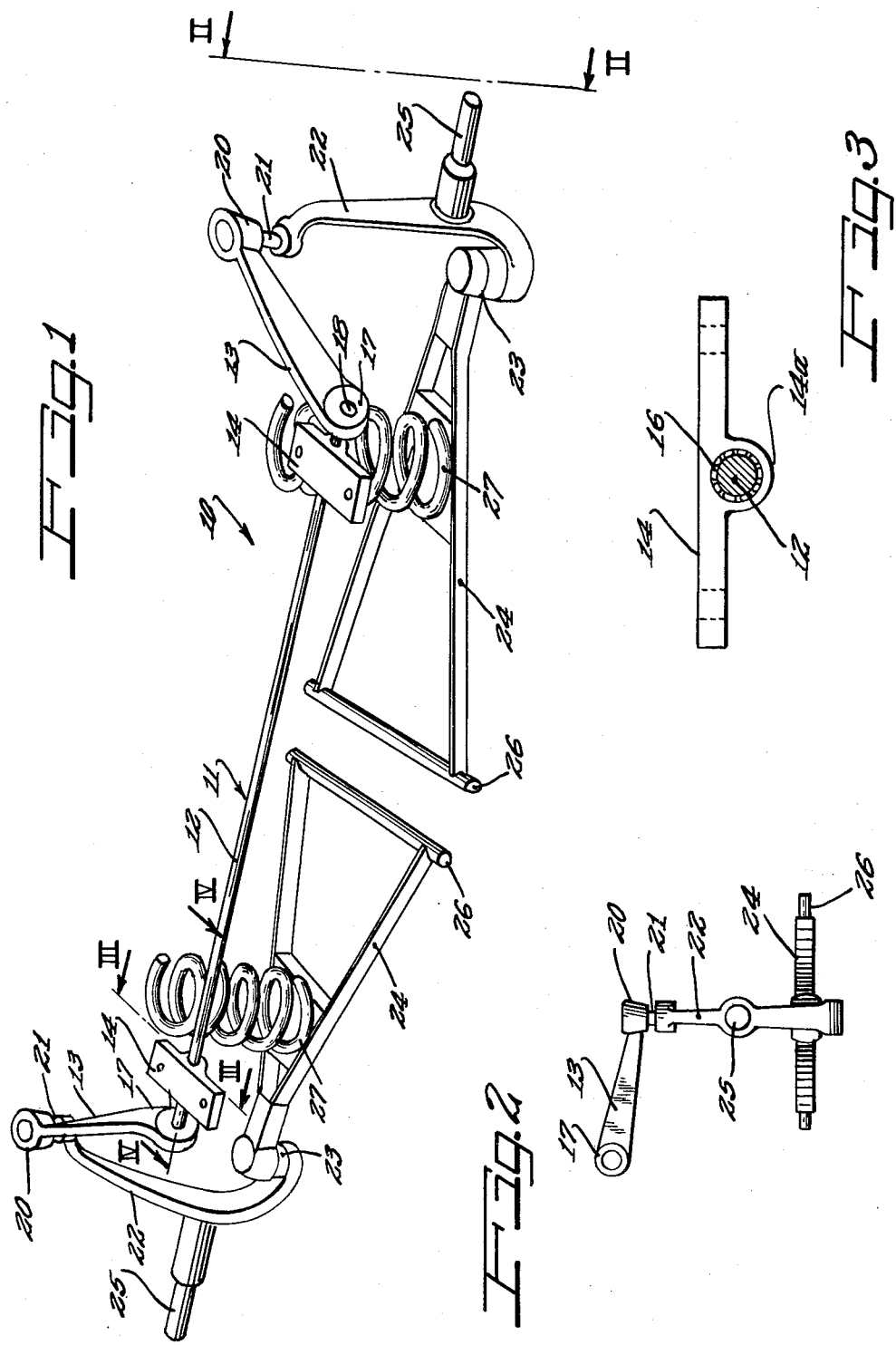

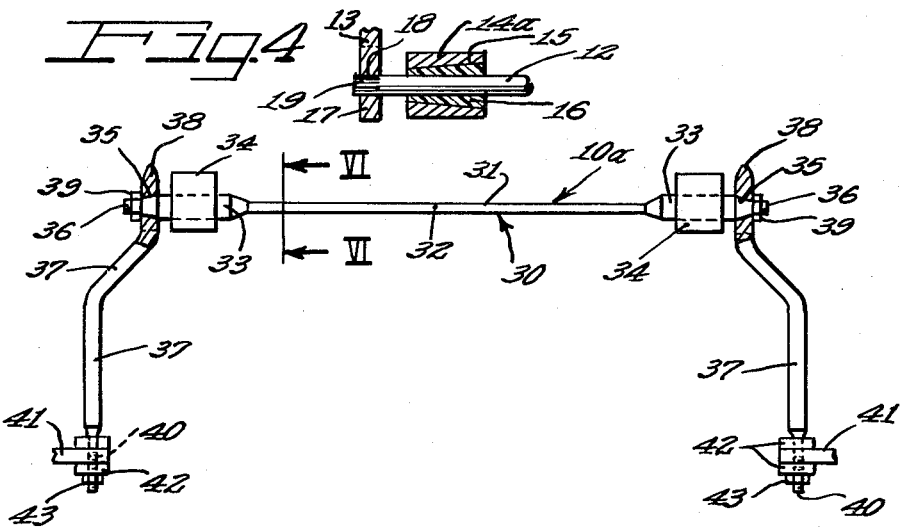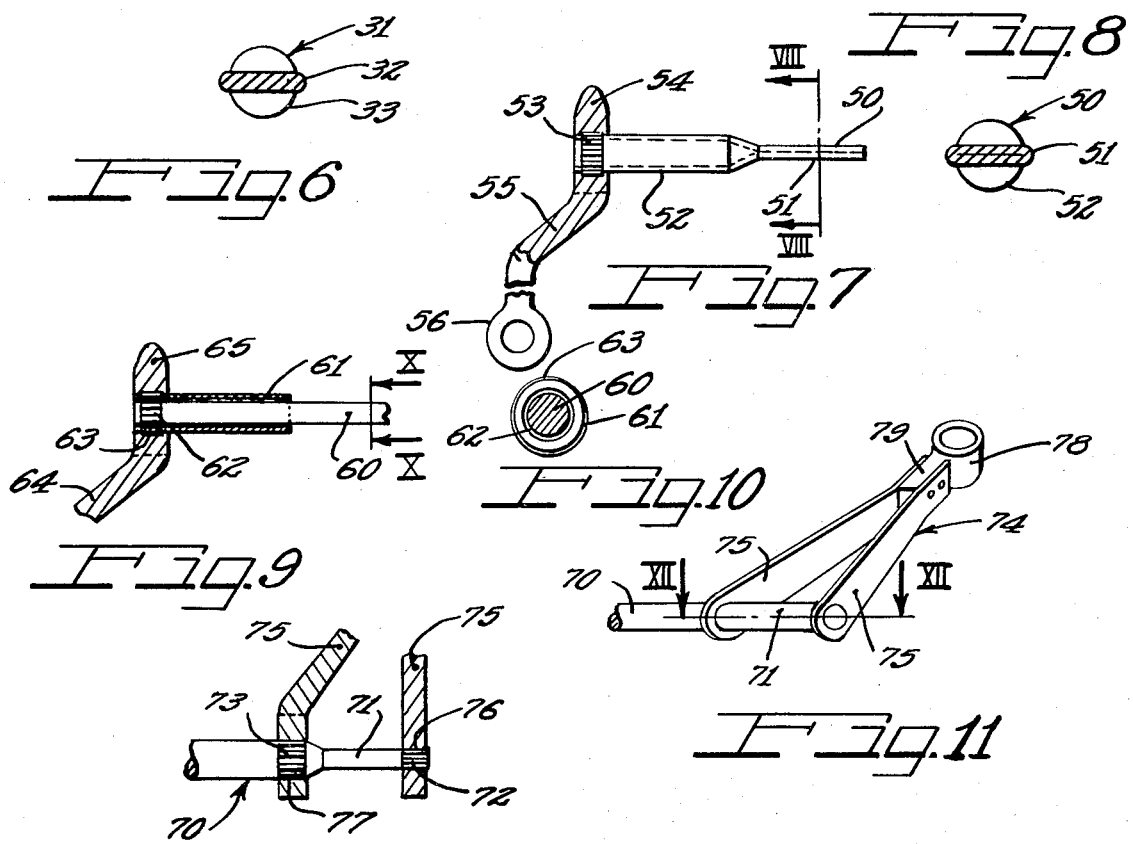
INVENTORS
Richard Cass
Edward J. Herbenar

TORSION BAR WHEEL SUSPENSION

BACKGROUND OF THE INVENTION

1. Field of the Invention

This invention relates to the art of controlling or reducing the heeling or tipping of a spring suspended vehicle travelling around curves by means of a stabilizer bar having resistance to torsion. The invention particularly deals with a torsion bar or stabilizer bar assembly composed of three separable and replaceable parts providing for wide variations in torsion resistance.

2. Description of the Prior Art

Heretofore stabilizer bars or torsion rods for automotive wheel suspensions have been provided in one piece with bent ends which swing up and down as the suspension springs compress or expand. During a turn of the vehicle the suspension spring on the outside tends to compress while at the same time the spring on the inside tends to expand as the vehicle tips due to centrifugal forces. Since the stabilizer bar or torsion rod is linked to the vehicle frame with the bent ends connected to the axle or control arm portion of the suspension, one bent end will swing downward while the other swings up thus imparting a torsional twist to the bar or rod. The torsional resistance of the bar or rod to this twist holds the vehicle level. In the one piece stabilizer bar or torsion rod assemblies, wear or breakage of any portion requires complete replacement, and load carrying requirements of the unit limit desired variations in torsional resistance for different usages. Thus high load carrying requirements demanded stiff heavy torsion bars resulting in stiff and hard ride conditions.

SUMMARY OF THE INVENTION

This invention now makes possible the design of stabilizer bar assemblies with required load carrying capacity and independent desired torsional resistance. According to this invention the heretofore known and used unitary torsion bar or rod is replaced with a three part assembly composed of a torsion bar and separate stabilizer arms replaceably attached to the ends of the bar. In ball joint wheel suspensions these stabilizer arms may be formed with ball joint sockets for connection to the upper end of the knuckle arm of the assembly. In rear wheel suspensions the stabilizer arms may be provided with threaded portions for connection to the vehicle axle. The connections between the torsion bar and the arms may be made in various ways according to this invention such as by means of conical wedge joints, serrated connections, press fits and the like. The connections make possible wide variation in torsion bar diameters, torsion tube wall thicknesses, amount of flattening of the solid bar or tube and the like and in addition if a torsion bar is not required for a particular suspension the stabilizer arms can still be used as control arms in the suspension.

It is then an object of this invention to provide a multiple part stabilizer bar assembly for vehicle suspensions.

Another object of this invention is to provide a torsion bar assembly consisting of a torsion bar, and a pair of stabilizer arms replaceably affixed to the ends of the torsion bar.

A still further object of the invention is to provide a torsion bar assembly which is free from bent ends and which carries replaceable stabilizer arms.

A further object of the invention is to provide joint connections between stabilizer arms and a torsion bar which will accommodate wide variations in bar diameters, torsion tube wall thicknesses and degrees of flattening of solid bars or tubes in the assembly.

A still further object of this invention is to provide stabilizer arms in a wheel suspension system which can be affixed to a torsion bar or to a suspension bearing pin in installations where torsion bars are not used.

Other and further objects of this invention will be apparent to those skilled in this art from the following detailed description of the annexed sheets of drawings which show several embodiments of the invention.

BRIEF DESCRIPTION OF THE DRAWINGS

FIG. 1 is an isometric view of a ball joint wheel suspension embodying a three part torsion bar according to this invention;

FIG. 2 is an end view taken along the line II—II of FIG. 1;

FIG. 3 is a cross-sectional view, on a larger scale, taken along the line III—III of FIG. 1;

FIG. 4 is a longitudinal sectional on a larger scale taken along the line IV—IV of FIG. 1;

FIG. 5 is a somewhat diagrammatic view of a torsion bar rear wheel suspension according to this invention;

FIG. 6 is a cross-sectional view along the line VI—VI of FIG. 5;

FIG. 7 is a fragmentary view showing a tubular torsion bar assembly according to this invention;

FIG. 8 is a cross-section taken along the line VIII—VIII of FIG. 7;

FIG. 9 is a view similar to FIG. 7 but showing another form of torsion rod and tube assembly according to this invention;

FIG. 10 is a cross-sectional view taken along the line IX—IX of FIG. 9;

FIG. 11 is an isometric view of another form of stabilizer arm according to this invention; and FIG. 12 is a cross-sectional view taken along the line XII—XII of FIG. 11.

DESCRIPTION OF THE PREFERRED EMBODIMENTS

The ball joint front wheel suspension 10 of FIG. 1 includes a torsion bar assembly 11 of this invention. The assembly 11 is composed of a straight torsion rod 12 and replaceable stabilizer arms 13, 13 affixed to the ends of the rod. The rod 12 is rotatably mounted in bearing supports 14, 14 secured to the frame of the vehicle (not shown). Each of these supports 14 has a tubular boss portion 14a with a tapered bore 15 therethrough receiving a low friction tapered bearing 16 as shown in FIGS. 3 and 4. The bearing 16 has a cylindrical bore therethrough supporting the rod 12 while the tapered outer wall of the bearing is wedge fitted in the tapered bore 15. The small end of the bore 15 is adjacent the end of the rod 12. The bearing material may be rubber, plastic such as nylon, "Teflon" or a polyolefin resin.

The arms 13 have eye ends 17 with splined bores 18 press fitted onto the knurled or splined ends 19 of the torsion rod 12 as shown in FIG. 4. The other ends of the stabilizer arms 13 have integral sockets 20 formed thereon carrying ball joints with ball stud shanks 21 depending therefrom and secured to the upper ends of the knuckle arms 22 of the assembly. The bottom ends of these arms 22 are connected through ball and socket joints 23 with the outer ends of the A-frames or control arms 24 of the suspension. The wheels of the suspension are mounted on spindles 25 projecting from the knuckle arms 22 and the inner ends of the control arms 24 have axle pins 26 which are rotatably supported in bearings carried by the vehicle frame.

Suspension coil springs 27 are compressed between pads on the A-frames 24 and corresponding pads (not shown) on the vehicle frame.

It will be understood that compression and expansion of the springs 27 to accommodate relative road movement of wheels on the spindles 25 and the vehicle body will result in a swinging of the arms 13 causing a twisting of the torsion rod 12. The resistance to torsional twist of the rod will stabilize the tilting of the vehicle body as centrifugal force tends to compress one spring while elongating the other spring when the vehicle is driven around a curve.

The suspension 10a of FIG. 5 illustrates generally a rear wheel suspension where a torsion bar assembly 30 of this invention is used. This assembly 30 includes a straight rod 31 with a flattened central portion 32 and cylindrical ends 33. These cylindrical ends are rotatably mounted in bearings 34 carried by the vehicle frame or body and project beyond the bearings to terminate in tapered end portions 35 with externally threaded reduced diameter tip ends 36. Stabilizer arms 37 have eye ends 38 with tapered bores wedge fitted on the tapered portions 35 of the torsion rod. Nuts 39 threaded on the threaded ends 36 of the bar force the eye ends 38 into fixed wedge engagement with the bar. The other ends of the arms 37 have externally threaded stems 40 receiving the eye ends 41 of axle mountings. Rubber bushings 42 straddle the eye ends 41 and a nut 43 on each stem 40 of the arms 37 links the arms with the axle mountings 41.

Relative swinging of the arms 37 will, of course, twist the torsion bar 31 which is free to rotate in the bearings 34. Since the rod has a main central portion 32 that is flattened (FIG. 6) its resistance to torsional twist is increased. The amount of flattening can be controlled to produce the desired torsional resistance for the suspension without affecting the size of the cylindrical ends 33 to interfere with standardized bearing dimensions or the like.

A further modified torsion bar suspension according to this invention is shown in FIGS. 7 and 8 wherein a tubular torsion rod 50 has a flattened central portion 51 and cylindrical end portions 52 for fitting in bearings such as 34. The outer ends of these cylindrical portions 52 are knurled at 53 to receive the eye ends 54 of the stabilizer arms 55. These eye ends 54 have cylindrical bores which are press fitted over the knurled ends 53 to be locked to the torsion tube. The other ends of the stabilizer arms 55 also are provided with eyes 56 to receive suspension linkage. In this arrangement the tube 50 can be flattened as desired to control torsion resistance without interfering with standard end diameters for bearing fit.

In a still further embodiment of the invention shown in FIGS. 9 and 10 a very small diameter solid torsion rod 60 receives sleeves 61 on the ends thereof. These sleeves have internally splined reduced diameter end portions 62 into which the ends of the rods 60 are press fitted and locked. In addition, the ends of the tube 61 surrounding the internally splined portion 62 are also knurled or splined as at 63 so that a stabilizer arm 64 with a cylindrical eye end 65 may be press fitted and locked thereon. In this arrangement, desired torsional resistance can be obtained by selecting a very small diameter rod 60 without interfering with bearing size requirements because the tubes 61 on the ends of this rod can be of standard bearing fitting size.

In a still further arrangement shown in FIGS. 11 and 12 a bifurcated stabilizer arm is provided. As there shown, a solid torsion rod 70 has a reduced diameter end portion 71 with a knurled end 72. The major diameter of the rod 70 is also knurled at 73 at the junction with the reduced diameter portion 71. A stabilizer arm 74 having two strap-like legs 75 mounted on the torsion rod 70 is provided with knurled holes 76 and 77 respectively fitting the knurled portions 72 and 73 in press fit relation to unite the arm to the rod. The other end of the arm carries a ball joint socket 78 with a stem 79 riveted between the straps 75.

From the above descriptions, it will therefore be understood that this invention provides many arrangements for mounting separate stabilizer arms on torsion bars, rods or tubes and that independent load strength and torsion resistance can be designed into the assembly. It will also be understood that worn or broken parts can be replaced without discarding the entire torsion suspension.

We claim as our invention:

1. A ball joint front wheel suspension for vehicles which comprises a pair of laterally extending bottom control arms pivoted to the vehicle at their inner ends, upright knuckle arms at the outer ends of the control arms, ball joints connecting the outer ends of the control arms with the bottoms of the knuckle arms, wheel spindles extending laterally outward from the intermediate portions of the knuckle arms, a torsion bar above the control arms, vehicle mounted bearings rotatably mounting the torsion bar inwardly from and closely adjacent to the ends thereof, stabilizer arms extending substantially normal to the axis of the torsion bar having inner ends detachably secured in non-rotatable relation to the ends of the torsion bar beyond the bearings, and ball joints connecting the other ends of the stabilizer arms to the upper ends of the wheel knuckles whereby raising and lowering of the knuckle arms is accommodated by swinging of the control arms on their inner pivots and by swinging of the stabilizer arms through torsional twist of the torsion bar and the bearings inwardly from the ends of the torsion bar hold the ends of the torsion bar on a fixed axis to support the knuckle arms in an upright position and whereby the individual stabilizer arm and torsion bar components may be easily and separately replaced.

2. The suspension of claim 1, wherein the torsion bar is a rod and each stabilizer arm has an eye end embracing the end of the rod and cooperating means in the eye and on the rod lock the arm against rotation on the rod.

3. The suspension of claim 2, wherein the ends of the rod and the eye ends of the stabilizer arms have cooperating knurled surfaces locking the arms against rotation on the rod.

4. The suspension of claim 1, wherein the ball joints connecting the other ends of the stabilizer arms to the upper ends of the wheel knuckles have sockets on said ends of the stabilizer arms and studs extending therefrom connected to the upper ends of the knuckle arms.

5. The suspension of claim 1, wherein the torsion bar is a hollow tube.

6. The suspension of claim 1, wherein the torsion bar is a hollow tube with a flattened central portion and cylindrical end portions receiving the stabilizer arms.

7. The suspension of claim 1, wherein the stabilizer arms are press fitted on the ends of the torsion bar.

* * * * *